Nov. 4, 1941.   C. J. DUNZWEILER   2,261,109

STORAGE BATTERY

Filed May 27, 1939

INVENTOR.
CARL J. DUNZWEILER
BY
*Kwis Hudson & Kent*
ATTORNEYS

Patented Nov. 4, 1941

2,261,109

UNITED STATES PATENT OFFICE 2,261,109

STORAGE BATTERY

Carl J. Dunzweiler, Cleveland, Ohio, assignor to Willard Storage Battery Company, Cleveland, Ohio, a corporation of West Virginia Application May 27, 1939, Serial No. 276,163

7 Claims. (Cl. 136—134)

This invention relates to storage batteries and more particularly to storage batteries of the multiple seal type having submerged or concealed intercell connectors.

The present application is in part a continuation of my original application, Serial No. 93,212, filed July 29, 1936, now Patent No. 2,180,463, issued November 21, 1939.

Various types of construction have been proposed for storage batteries to provide for submerged or concealed intercell connectors and many of such proposed constructions have been subject to the disadvantage that an acid-tight seal has not been obtainable at the intercell connection. The leakage of acid at this point is highly undesirable because of the corrosion and other harmful results flowing therefrom. It may therefore be said that, as its principal object, the present invention is directed to elimination of acid leakage and the provision of an improved intercell connection which is, in this and other respects, superior to the intercell connections heretofore proposed.

Another object of my invention is to provide an improved intercell connection involving the use of a connector of a novel construction facilitating the assembly of the same with the connector lugs by lead-burning.

A further object of my invention is to provide an improved construction for intercell connections involving the use of a connector and connector lugs of novel form which can be readily assembled and with which a durable and more satisfactory connection can be made between cells of a storage battery.

The invention may be further briefly summarized as consisting in certain novel combinations and arrangements of parts hereinafter described and more particularly set out in the appended claims.

Figure 1:
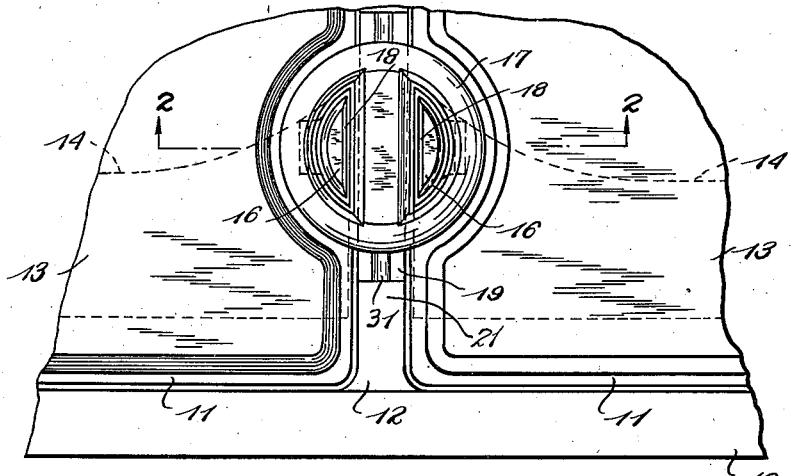
Fig. 1 is a partial top plan view of a storage battery embodying the intercell connection of my invention and showing the same before the sealing compound has been applied.

In the accompanying drawing, to which more detailed reference will now be made, I have shown a multiple cell storage battery having my improved form of intercell connection embodied therein. Before proceeding with the detailed description, it will be understood, of course, that my invention is not necessarily confined to the particular form of battery illustrated, nor to the particular arrangements and details of construction hereinafter described.

In the drawing I show a storage battery having a container 10, provided with a plurality of compartments which form battery cells 11. The adjacent cells are separated by a fluid-tight intercell partition 12 which extends upwardly to a point near the top of the container. Each of the cells 11 is provided with an upwardly dished individual cover 13 which provides a closure for the top of the cell compartment. Each cell also contains the usual battery elements such as plate groups, separators and a quantity of acid or electrolyte.

As is usual in storage batteries, certain of the plates of the cells 11 are connected adjacent their tops by the laterally extending straps 14 carrying lugs or terminal posts 16 which extend upwardly adjacent opposite sides of the partition 12. As will be explained more in detail hereinafter, my improved intercell connection includes a connector 17 which cooperates with and connects the lugs 16.

As will be seen in the drawing, the connector lugs 16 are of substantially segmental cross-sectional shape and are disposed with their flat chord faces 18 adjacent opposite sides of the partition 12 and in substantially parallel relation with each other. The partition 12 is preferably provided with a notch or recess 19 in the upper edge thereof which accommodates the connector 17 and the connector lugs 16 lie adjacent this recess and project upwardly above the bottom thereof.

Figure 2:
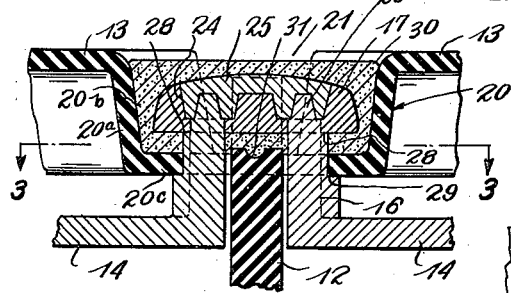
Fig. 2 is a partial sectional view taken through the intercell connection, as indicated by line 2—2 of Fig. 1, but showing the same after the sealing compound has been applied.
Figure 3:
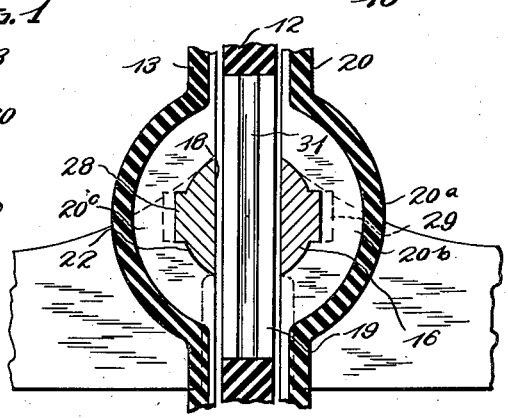
Fig. 3 is a partial transverse sectional view taken through the battery structure as indicated by line 3—3 of Fig. 2, but with the sealing compound omitted.
Figure 4:
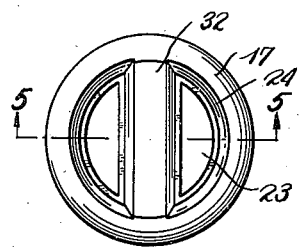
Fig. 4 is a detached plan view of the connector.
Figure 5:
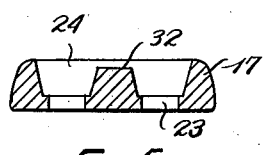
Fig. 5 is a transverse sectional view taken through the connector as indicated by line 5—5 of Fig. 4.

The covers 13 may be upwardly dished hollow covers, molded from suitable material or otherwise constructed, and having a depending marginal wall or skirt 20. The covers of the adjacent cells 11 fit into the tops of the cell compartments leaving a groove 21 extending across the top of the battery between the covers and into which the top or upper edge of the partition 12 extends. Adjacent the notched portion of the partition and the connector lugs 16, the depending walls of the covers have arcuately curved concave portions 20a defining a substantially circular pocket or recess 20b into which the connector lugs project. The depending walls 20 of the covers may be tapered or inclined, as shown in Fig. 2, so that the walls of the slot 21 and of the recess 20b will be tapered or inclined. The cover walls 20, including the arcuate portions 20a thereof, are provided along their lower edges with laterally extending flange portions which extend toward the partition 12. The portions of these lateral flanges which are contiguous to the arcuate wall portions 20a, form bottom wall portions 20c for the recess 20b. The wall portions 20c may have notches or recesses 22 in their edges which are shaped to receive the connector lugs 16 and to conform to the outline or cross-sectional shape thereof.

As shown in Fig. 2, the connector lugs 16 extend into the recess or pocket 20b, projecting above the bottom of the partition recess 19 and above the bottom wall formed by the laterally projecting cover portions 20c. The connector 17 by which the lugs 16 are to be electrically connected, may be of substantially circular plan shape or of disk-like form and may have a pair of substantially segmental openings 23 therein adapted to receive the connector lugs 16. The connector 17 may also have a recessed top providing an upwardly opening pocket 24 with which the openings 23 communicate and in which molten lead may be puddled to form a body 25 for integrally uniting the connector with the lugs 16. The openings 23 of the connector are of segmental shape, as mentioned above, that is to say, are of a shape and arrangement to correspond with the connector lugs 16 so that when the connector is applied to the lugs the latter will engage snugly in the segmental openings and will more or less, close or seal the same to enable the upwardly opening pocket 24 of the connector to retain the molten lead.

To facilitate the lead-burning operation, and to improve the connection formed between the connector 17 and the lugs 16, I may provide the tops of the latter with extension portions 26 of relatively reduced size which extend into the recessed top of the connector. These extension portions 26 may likewise be of segmental shape and may be tapered or beveled as shown in the drawing, and during the lead-burning operation these extension portions will become integrally united with the body of lead 25 which fills the recess of the connector.

For locating the connector 17 on the lugs 16 and holding the same in position for the lead-burning operation, I may provide the lugs with shoulders 28 which form rests for the connector. I may also provide the lugs 16 with a second pair of shoulders 29 thereon at a lower point than the shoulders 28 and which form rests or supports for the covers 13 and are engaged by the laterally extending cover portions 20c.

After the connector 17 has been applied to the lugs 16 and has become integrally united therewith, as by the solidification of the body 25 in the pocket of the connector, sealing compound 30 may be poured into the groove 21 and into the recess 20b, filling the same to a point or level which will cause the connector and the exposed portions of the lugs 16 to become embedded therein. If desired, the bottom of the partition recess 19 may be provided with an arcuate groove 31 into which some of the sealing compound will flow and form an interlock with the partition tending to prevent lateral shifting or loosening of the body of compound.

Figure 6:
Fig. 6 is a similar sectional view illustrating a modified form of connector.

As shown in the drawing, the connector 17 may be constructed with an integral bar portion 32 extending across the pocket or recess thereof and which serves to reinforce this member. It will be understood, of course, that if desired, this bar portion can be omitted in which case the wall forming the bottom of the pocket of the connector would be of substantially uniform thickness throughout. On the other hand, if desired, I may use a modified form of connector 17a, shown in Fig. 6, in which the transverse bar portion 32a has a depth or thickness equal to that of the outer or rim portions of the connector.

From the foregoing description and the accompanying drawing, it will now be readily understood that I have provided an improved form of intercell connection and have provided a connector and connector lugs of novel construction to be used in forming such intercell connection. It will also be seen that the novel intercell connection which I have provided can be readily completed by a lead-burning operation and that the connector lugs will support and retain the connector in proper position to facilitate the lead-burning operation. Moreover, it will be seen that the novel intercell connection which I have provided is of rugged and durable construction and is not likely to become loosened or to permit the escape of electrolyte.

While I have illustrated and described the improved battery construction of my invention in a somewhat detailed manner, it will be understood, of course, that I do not wish to be limited to the precise details of construction and arrangements of parts herein disclosed, but regard my invention as including such changes and modifications as do not constitute a departure from the spirit of the invention and the scope of the appended claims.

Having thus described my invention, I claim:

1. In a storage battery, a pair of cells having upright connector lugs of substantially segmental cross-sectional shape, and a connector adapted for connection with said lugs and having corresponding substantially segmental openings therein of a size to snugly receive said lugs.

2. In a storage battery, a pair of cells having upright connector lugs of substantially segmental cross-sectional shape, and a connector adapted for connection with said lugs, said connector having a recessed top for molten lead and segmental openings in its under side adapted to snugly receive said lugs with portions of the latter projecting upward into the recessed top.

3. In a storage battery having cells with a partition therebetween, connector lugs of substantially segmental cross-sectional shape extending upward on opposite sides of the partition with the chord faces thereof adjacent the partition, and a connector adapted for connection with the lugs and having substantially segmental openings therein of a size to snugly receive said lugs.

4. In a storage battery having cells with a partition therebetween, connector lugs of substantially segmental cross-sectional shape extending upward on opposite sides of the partition with the chord faces thereof adjacent the partition, and a connector adapted for connection with the lugs by lead-burning or like, said connector having a recessed top and substantially segmental openings in its under side leading to the recessed top and adapted to snugly receive said lugs for the retention of molten lead in the recessed top.

5. In a storage battery having cells with a partition therebetween, connector lugs of substantially segmental cross-sectional shape extending upward on opposite sides of the partition with the chord faces thereof adjacent the partition, covers for said cells having depending arcuate wall portions defining a substantially circular recess into which said lugs extend, and a connector substantially circular in plan shape lying in said recess and having substantially segmental openings therein of a size to snugly receive said lugs.

6. In a storage battery having cells with a partition therebetween, connector lugs of substantially segmental cross-sectional shape extending upward on opposite sides of the partition with the chord faces thereof adjacent the partition, covers for said cells having depending arcuate wall portions defining a substantially circular recess into which said lugs extend, said wall portions having adjacent their lower edges lateral flanges extending toward said partition, a substantially circular connector lying in said recess and having substantially segmental openings therein of a size to snugly receive said lugs, and sealing compound embedding said connector and portions of said lugs.

7. In a storage battery having cells with a partition therebetween and lugs extending upward adjacent opposite sides of the partition, covers for said cells having depending arcuate wall portions defining a substantially circular recess into which said lugs extend, and a generally flat connector of substantially circular plan shape disposed in said recess for connecting said lugs, said connector having a recessed top for molten lead and openings in the underside adapted to snugly receive said lugs for retention of the molten lead and with portions of the lugs projecting upward into the recessed top.

CARL J. DUNZWEILER.